United States Patent
Baiardi et al.

(10) Patent No.: US 6,541,728 B1
(45) Date of Patent: Apr. 1, 2003

(54) METHOD AND APPARATUS FOR TENSIONING A WIRE ELECTRODE IN A SPARK-EROSION MACHINE

(75) Inventors: Giorgio Baiardi, Locarno (CH); Peter Wehrli, Ascona (CH)

(73) Assignee: Agie SA, Losone (CH)

( * ) Notice: Subject to any disclaimer, the term of this patent is extended or adjusted under 35 U.S.C. 154(b) by 7 days.

(21) Appl. No.: 09/795,560

(22) Filed: Feb. 28, 2001

(30) Foreign Application Priority Data

Feb. 29, 2000 (DE) .......................... 100 09 556

(51) Int. Cl.[7] ................................. B23H 7/10
(52) U.S. Cl. ................... 219/69.12; 226/195; 242/422.2
(58) Field of Search ................ 219/69.12; 226/195; 242/151, 152, 422.2

(56) References Cited

U.S. PATENT DOCUMENTS

| | | | |
|---|---|---|---|
| 3,270,932 A | * 9/1966 | Smith, Jr. | |
| 4,242,556 A | 12/1980 | Ullmann et al. | 219/69.12 |
| 4,965,428 A | 10/1990 | Gotou et al. | 219/69.12 |
| 5,038,990 A | * 8/1991 | LeCompte et al. | |
| 5,495,086 A | 2/1996 | Onandia | 219/69.12 |
| 5,866,865 A | 2/1999 | Bezzola et al. | 219/69.12 |
| 6,078,019 A | 6/2000 | Medici et al. | 219/69.12 |

FOREIGN PATENT DOCUMENTS

| | | | |
|---|---|---|---|
| DE | 26 25 349 C2 | 5/1977 | |
| DE | 28 09 339 A1 | 9/1978 | |
| DE | 39 33 499 A1 | 4/1990 | |
| DE | 195 02 151 A1 | 8/1995 | |
| DE | 44 14 233 A1 | 10/1995 | |
| DE | 196 07 705 A1 | 9/1997 | |
| DE | 196 46 677 A1 | 5/1998 | |
| EP | 0 083 118 A2 | 7/1983 | |
| EP | 792714 A | * 9/1997 | |
| JP | 63-256313 A | * 10/1988 | 219/69.12 |
| JP | 4-105822 A | 4/1992 | |

OTHER PUBLICATIONS

*Examination Report* of the German Patent Office corresponding to German Patent Application Ser. No. 100 09 556.9, dated Oct. 26, 2000, 4 pages.

* cited by examiner

*Primary Examiner*—Geoffrey S. Evans
(74) *Attorney, Agent, or Firm*—Marshall, Gerstein & Borun

(57) ABSTRACT

A wire tensioning system for a wire-shaped working electrode of a spark erosion machine and a procedure for the tensioning of the working electrode. The working electrode at least nearly circumferentially encompasses a braking roller in a wire entry zone and/or a tensioning roller in a wire withdrawal zone. A nozzle is assigned to the braking and/or the tensioning roller such that the nozzle exerts a tensile force on the working electrode to tension the wire.

19 Claims, 6 Drawing Sheets

METHOD AND APPARATUS FOR TENSIONING A WIRE ELECTRODE IN A SPARK-EROSION MACHINE

FIELD OF THE INVENTION

The invention relates generally to spark-erosion machines, and more particularly to a method and apparatus for tensioning a wire shaped metal working electrode in a spark-erosion machine.

BACKGROUND OF THE INVENTION

As used herein, the word "wire tensioning" relates principally to the drawing force exerted on the metal working electrode under the assumption of a constant electrode diameter.

An example of a wire tensioning system and procedure in accord with the generic type is disclosed by DE 196 07 705 A1. In this instrument the wire shaped metal working electrode (hereinafter "electrode wire") is withdrawn from a supply reel and guided over several directional change rollers to a braking roller. The electrode wire circumferentially embraces the braking roller, then runs over further directional change rollers to a clamping roller-pair, and from this to a container for waste recycling. For the automatic startup threading of the electrode wire about the braking roller, DE 196 07 705 A1 further proposes to furnish injector nozzles to produce jets of a through-flowing fluid. This arrangement is so constructed, that during the introduction of the electrode wire, a fluid flow tangential to the braking roller is produced, so that the electrode wire is guided about the circumference of the braking roller.

The establishment of the wire tensioning is done with the aid of three motors, which drive the supply spool, the braking roller, and the clamping roller-pair. In this combination of drivers, the clamping roller-pair motor determines the desired transport speed of the electrode wire. The braking roller generates, with the aid of the thereby caused friction effects, the specified electrode wire tensioning especially in the working area within the confines of the workpiece to be machined. When the electrode wire is brought to the electrically conductive workpiece, there occurs an electrical discharge, and a material removal occurs in accord with the known technology of spark erosion machining. By means of a relative motion between the electrode wire and the workpiece, the desired shaping can be achieved. In any case, where the spark erosion process is concerned, forces are generated, for instance from electromagnetic and electrostatic fields, which lead to a deviation in path of the electrode wire. In order to reduce this deviation, the wire electrode is tensioned, as has been explained above.

It is desirable to make available an improved wire tensioning system and a better procedure for tensioning of an electrode wire than can be supplied by the present conventional systems as described above.

ADVANTAGES OF THE DISCLOSED APPARATUS

In accord then, with this purpose, a wire tensioning system is disclosed for an electrode wire, or the like, of a spark erosion machine, in which the electrode wire circumferentially and frictionally embraces a braking roller placed in the wire entry zone and/or also so embraces a tensioning roller placed in the wire withdrawal zone. Further, the braking and/or the tensioning roller is provided with attendant fluid through-flow nozzles which are so designed that they engender in the wire entry zone and/or the wire withdrawal zone a pulling force on the electrode wire for the generation of a basic tension.

The procedure, then, is for the tensioning of an electrode wire, or the like, in a spark erosion machine, wherein the electrode wire, at least partially frictionally and circumferentially embraces a braking roller in the wire entry zone and/or so embraces a tensioning roller in the wire withdrawal zone. Additionally, an electrode wire is further placed under tension by means of one of the fluid through-flow nozzles associated with the braking roller and/or the tensioning roller, for the generation of a basic tension in the electrode wire entry zone, and preferably also in the electrode wire withdrawal zone.

In this procedure, under the concept of "braking roller", an optional roller is placed in the electrode wire entry zone. That is, as one looks in the wire travel direction, the braking roller is located in front of the operational position of the spark erosion machine (i.e., the position in which the workpiece is situated). Preferably, however, the roller is proximal to an upper electrode wire guide-head of a cutting erosion machine. Conversely, the "tensioning roller", is to be found (again looked at in the direction of the electrode wire travel), following the operational position of the spark erosion machine, that is, in the electrode wire withdrawal zone, preferentially proximal to the lower electrode wire guidance head of a cutting spark erosion machine.

The fluid through-flow nozzles associated with the braking and the tensioning rollers, fulfill the purpose of generating a basic tension of the electrode wire in both the wire entry and wire withdrawal zones, and do so before the braking roller and following the tensioning roller, as seen in the travel direction of the electrode wire. This is carried out in that the nozzle jet engenders a tensile force counter to that of the braking or tensioning roller on the already introduced electrode wire. In this way, the electrode wire comes into a frictionally conditioned effective engagement to grip the braking and/or the tensioning roller. The effective tensioning in the operational position of the spark erosion machine, in which position the workpiece lies (that is, the tension, as seen in the travel direction of the electrode wire, immediately behind the brake roller and directly in front of the tensioning roller), is built up in accord with the cable-friction principle under which the braking and/or the tensioning roller operates.

In this way, in a particularly advantageous manner, the effect can be of value. The value lies in the fact that already a relatively small tensile force, or tensile force change, effected by the nozzles, is sufficient to attain the necessary effective tension. In other words, this means essentially exerting influence on the effective tension. The electrode wire embraces, namely, the braking and/or the tensioning roller. Because of the basic tension generated by the accelerating/decelerating action of the nozzle jets, the wire remains in an effective grasping contact with the respective roller, because of frictional forces between the electrode wire surface and the roller periphery. In accord with the cable friction formula in accord with Euler, the following equation is valid:

$$F2 = F1 \times e^{\alpha \mu}$$

where
  F1 is the basic tensile force generating the basic tension;
  F2 is the effective tensile force generating the effective tension;

α is the angle of wrap around the circumference; and

μ is the coefficient of friction.

In accord with this formula, the effective tensile force is essentially proportional to the basic tensile force. If the product of the wrap angle and the friction coefficient is large enough, then the system is self restraining (i.e., F2 becomes independent of F1 where F1=0).

In accord with the above, the following can be attained, among other advantages:

greater tensile force in the operational position, higher reliability better operator friendliness better possibilities for automation of the electrode management It is advantageous, if the nozzle is designed as a venturi nozzle, bringing about a flow of fluid, and thereby making use of the tensile force on the electrode wire. The fluid especially preferred is that operating fluid which is itself designed for spark erosion. Preferably, the nozzle is an injector nozzle. This can, for instance, be constructed as a two-chamber nozzle with two, chambers placed essentially coaxially to one another.

Advantageously, the electrode wire is penetratively run through one of the chambers of the injector nozzle. The outer nozzle chamber, is preferably connected to a pressure fluid supply. Particularly advantageous is a situation in which the inner nozzle chamber structure—as seen in the travel direction of the electrode wire—is extended to protrude beyond the outer nozzle chamber. Also, it is advantageous, if between the nozzle and the braking and/or tensioning roller to which the nozzle is assigned, no other additional rollers, such as direction-change rollers or the like, are to be found. The nozzle should be further in the general proximity of the roller to which it is assigned.

Particularly of value, beyond the above, a means is provided, which applies to the tensioning roller a moment of rotation and/or an additional means for applying a moment of rotation to the braking roller. For this purpose, for instance, corresponding motors can serve, which, respectively, drive or brake the rollers. For instance, the means can be a tensioning roller motor, which drives the tensioning roller, and the additional means a braking roller motor which brakes the braking roller.

The nozzle which evokes the frictional action is preferably so designed, that the tensile force exerted by it upon the electrode wire is directed away from the associated roller. For example, the nozzle—as seen in the travel direction of the electrode wire—can be located behind the tensioning roller. It can further be worthy of consideration, to place the nozzle before the braking roller, that is to say, in front of the working station. Particularly advantageous is a design, wherein the nozzle is (seen in the travel direction of the wire), located behind the braking roller in the wire withdrawal zone, i.e. behind the operational position with the workpiece. The nozzle is, in this case, located relatively distant from its associated braking roller. Of advantage, the tensioning roller can be totally dispensed with. This design of the electrode wire tensioning system is of particular value in the case of relatively fine electrode wires. In this case, the jet produced by the nozzle generates the effective tensile force. The basic tensile force in front of the brake roller must be built up by an additional nozzle or by means of another auxiliary device such as weight tensioning or an idler roller.

An electrode wire tension system which exhibits a tensioning roller and wherein the nozzle is one of the nozzles associated with the tensioning roller, which is located behind (as seen in electrode wire travel direction), the tensioning roller is particularly advantageous. This nozzle further exerts force on the electrode wire in a direction away from the tensioning roller. In this design, for instance, the braking roller can be dispensed with. It is particularly advantageous, nevertheless, if additionally a braking roller is provided, especially a braking roller of the above mentioned design, that is, with a tension producing nozzle assigned thereto. In this case, the basic tensile force is built up by means of the roller, that is, by the drive means assigned thereto.

It is of advantage, if the electrode wire at least nearly circumferentially wraps around the braking roller and/or the tensioning roller and finds itself in effective, gripping, operational contact with the braking roller and/or the tensioning roller because of frictional forces. The wrap-around angle runs generally less than 360°, particularly between 310° and 350°, and most preferred is 330°. The wrap-around angle can alternately also be greater than 360°. For instance, the electrode wire can make multiple wrap-arounds about the corresponding roller. By that means, with the intervention of fluid flow through the nozzles a substantial frictional action on the rollers is achieved, and therewith an exceptional attainment of force transmission to the tension of the electrode wire occurs, without damage to the electrode wire or a wire overlapping on the rollers.

In a further preferred example, in the case of the wire tensioning system, additional means are provided for the measurement of the tension on the electrode wire. Advantageously, the electrode wire is guided to one or two directional change rollers. When this is done, at least one of the two directional change rollers is made elastically resilient by means of a spring anchorage. The measurement means determines the position of these directional change rollers, the spring means, and/or further auxiliary means of the tension of the respectively present electrode wire. The data so obtained makes it possible, that a control device can regulate the fluid flow produced from the nozzles in relation to the wire tension measured and/or in relation to the set point values.

In this way, the tensile force activated by the nozzle and applied to the electrode wire, and therewith also its basic tensile force, can be influenced. Thus, the effective tensile force available at the work position, that is the effective wire tension, can be controlled. Variations in the basic tensile force and therewith in the resulting effective tensile force have a negative effect on the quality of metal working.

Principally, the tensioning roller and/or the braking roller are preferably constructed as cylindrical disks, whereby, advantageously, symmetrically within the rim surfaces, a uniform, circumferential groove is provided, and the groove narrows itself toward the center of the side surfaces and in the direction of the disk axis. Such rollers make possible a practically vibration-free precise electrode wire guidance and thus improve metal working quality on a workpiece. The rollers are also capable of handling wires of varying diameters. For example, by means of a V-shaped groove, the frictional force between the braking rollers (as well as the tensioning roller) and the electrode wire is increased.

Advantageously, in the case of the braking roller and/or the tensioning roller a spiral threaded guide to and/or a threaded guide return for the electrode wire is provided to maintain the electrode wire in the desired center groove. For instance, upon an initial introduction of the electrode wire, this wire could find itself displaced from the center axis (i.e., from the "V-notch") of the corresponding roller. With the aid of the guide-in and guide-back means, the electrode wire is guided to (or back to) the central circumferential groove.

Also the electrode wire, in case it jumps out of the above mentioned groove during operation of the machine, is transported back to its proper place. Threaded windings of this sort can be optionally installed not only in the brake and tensioning rollers, but also in optional other rollers of the spark erosion machine. Advantageously, for such a roller, two threadings are provided, which allow for wire returning in opposite axial directions.

Beyond this, such a roller is advantageously built in two parts, whereby from two parts one interposed groove is formed and is used for the conducting of the electrode wire.

Finally, in an advantageous example, in a fluid flow channel, in which the electrode wire is transported, that is to say, is carried along, one or more relief borings are provided, through which energy-poor fluid can be released. These relief borings are advantageously located at such positions where a substantial part of the next available kinetic energy has already been transferred to the fluid, that is, near to a flow accelerating nozzle. This prevents a situation, in which slow moving, and hence energy poor fluid interferes too strongly with newly incoming, energy rich fluid. Further, a sequential, continual increase in volume flow is avoided.

BRIEF DESCRIPTION OF THE DRAWINGS

In the following, the examples are described and explained in more detail with the aid of the attached schematic drawing wherein.

DETAILED DESCRIPTION OF PREFERRED EXAMPLES

In the following descriptions, the same reference numbers are used for the same, or functionally like components. Further, the terms "above" and "below" refer to the conventional operational installation of a wire spark erosion machine, in which braking means are positioned "above" and tensioning means are positioned "below."

Figure 1:
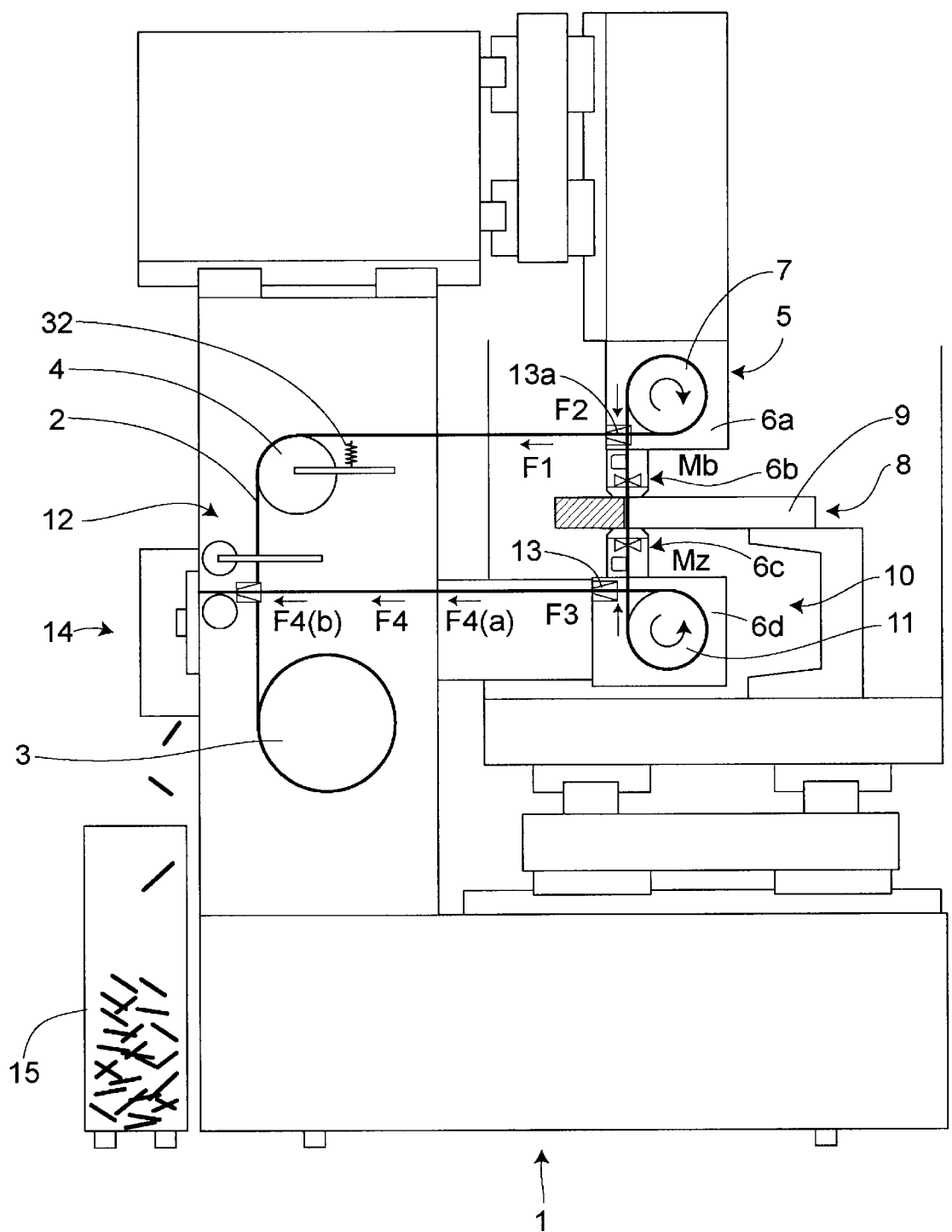
FIG. 1 is a schematic representation of a spark erosion machine with an exemplary wire tensioning apparatus constructed in accordance with the teachings of the present invention.

FIG. 1 provides an overview of a spark erosion machine 1 possessing a wire tensioning apparatus constructed in accordance with the teachings of the present invention. The wire tensioning apparatus of FIG. 1 exhibits—as seen in the wire travel direction—in front of the work position of the spark erosion machine, a braking apparatus 5 as well as a—as seen in the wire travel direction—tensioning apparatus 10 located after the work position of the spark erosion machine. The electrode wire, that is, the wire shaped machining electrode 2, which is to be tensioned by the wire tensioning apparatus (hereafter electrode wire 2), is first found on a supply spool 3, wherein the electrode wire 2 is wrapped in several layers over and beside one another about the core of the supply spool 3. From the supply spool 3 the unwinding electrode wire 2 runs vertically upwards to an idler roller 4 which is preloaded against the travel direction of the electrode wire 2. This idler roller 4 is resiliently secured by a spring means 32 which in turn is anchored to the spark erosion machine 1. This idler/spring arrangement serves, among other things, as a compensation element (electrode wire storage) as well as a measuring instrument for the wire tensioning.

The electrode wire 2 then runs over the upper quarter of the idler roller 4, and is directed about 90° to the right (in FIG. 1) in a horizontal direction to the braking apparatus 5.

This braking apparatus 5 is enclosed in a housing-like guide block 6a and possesses a braking roller 7, which is rotatably mounted in bearings in the guide block 6a and is further driven by a braking motor. On the periphery of the braking roller 7 a V-shaped groove is provided, in which the electrode wire 2 is accommodated. The electrode wire 2 runs in a counter clockwise direction around the braking roller 7, and wraps about the braking roller 7 with an angle of about 270° so that the electrode wire 2, because of frictional forces, is in effectively gripping contact with the braking roller 7.

From the braking roller 7, the electrode wire runs vertically downward through an upper guide head 6b (which is connected with the guide block 6a) to the characteristic working position 8 with the workpiece 9, and from there on further through an under guide head 6c to a tensioning apparatus 10.

This tensioning apparatus 10 is similar to the braking apparatus 5 in that it is housed in a guide block 6d and possesses therein a tensioning roller 11, which is rotatably supported in bearings, and which is driven by a tensioning roller motor. On the circumference of this tensioning roller 11 is provided a groove, in which the electrode wire 2 can be accommodated. Electrode wire 2 runs in a counter clockwise direction also about the tensioning roller 11. The electrode wire 2 wraps around the tensioning roller 11 with a wrap angle of about 270°, so that the electrode wire 2, because of frictional forces, is in an effectively gripping contact with the tensioning roller 11. From the tensioning roller 11, the electrode wire 2 runs horizontally to the left in the direction of two counter rolling rollers, which form a clamping pair 12. From these clamping rollers 12, the electrode wire proceeds to an electrode wire recycling removal arrangement. In an alternative, but not shown example, instead of the clamping roller pair, essentially a guide roller is provided.

In the area of the electrode wire recycling is placed an electrode wire cutting apparatus 14, which cuts the electrode wire into small pieces. The pieces of the cut-up electrode wire 2 are collected in a container.

In the guide block 6d—as seen in the travel direction of the electrode wire—behind the tensioning roller 11 a tension nozzle is 13 is provided. This will be more completely described in connection with FIG. 4. A fluid flows through the tension nozzle 13 in the direction of the electrode wire 2 travel, from which nozzle the same fluid will be ejected downward. The fluid can, for instance, be air, or, for example, the dielectric fluid used in spark erosion machining for rinsing and cooling. By the ejection of the fluid, a fluid flow is created in a direction away from the tensioning roller 11. The electrode wire 2 runs centrally placed, directly through the tensioning nozzle 13, and because of the friction between the fluid and the electrode wire 2 surface, is carried along by the produced fluid flow.

In other words, by means of the tensioning nozzle 13, a tensile force F4(a), which is directed away from the tensioning roller 11 is exerted on the electrode wire 2, which the electrode wire 2 brings into a frictional gripping with the tensioning roller 11. The basic tensile force is also exclusively generated by the nozzle 13.

Alternative to this exclusive force generation approach, the tensile force can be increased, in that the clamping roller pair 12 can be driven with the aid of an associated motor, to thus subject the electrode wire 2 is subjected to a further tensile force F4(b). Then, the electrode wire 2 behind the tensioning roller 11, as seen in the direction of the wire travel, is subjected to a combined basic tensile force of F4=F4(a)+F4(b). The clamping roller pair 12 is controllable, that is, it can be automatically opened and closed. The clamping roller pair 12 becomes activated, when a greater basic tension is required, which cannot be attained by the nozzles alone.

In the case of the above mentioned alternative example without a clamping roller pair, the basic tensile force is continually and exclusively produced by the nozzle 13.

The tensioning roller motor drives the tensioning roller 11, and produces at that point, a rotational moment Mz in a counter clockwise direction in FIG. 1. Because of the friction between the electrode wire 2 and the tensioning roller 11 an effective tensile force F3 is exerted on the electrode wire 2 in the area in front of the tensioning roller 11. Further, by means of the idler roller 4, seen in the direction of the travel of the electrode wire, in an area lying in front of the braking roller 7 a tensile force F1 is exerted on the electrode wire 2, which force is directed away from the brake roller 7. The basic tensile force F1 is enhanced by a nozzle 13a, which, as shown in FIG. 1, is placed in front of the braking roller 7 at the brake apparatus 5, as seen in the direction of the wire travel. This nozzle 13a is designed similarly to the nozzle 13, 13' shown in FIG. 4 and engenders on the electrode wire a force directed away from the braking roller 7. This force arises since this nozzle 13a pulls in fluid through its pressurized fluid intake port, and this fluid is ejected in the direction of a funnel-shaped, through opening, whereby a fluid flow directed away from the braking roller 7 is brought about.

Based on the above related reinforcement effects, consideration can be given to a situation wherein the basic tensioning force F1 proceeds from the nozzle 13a alone, that is, additional tensioning means such as the idler roller 4 can be dispensed with.

The motor of the braking roller drives the roller 7 and produces thereon a braking moment Mb in clockwise direction. Because of the friction between the electrode wire 2 and the braking roller 7, accordingly the electrode wire 2, in the area after the braking roller 7, is subjected to an effective tensioning force F2.

The two effective tensioning forces F2 and F3 act in opposite directions, whereby, in the work position 8 of the spark erosion machine 1, the necessary wire tension for the machining work on the workpiece 9 is produced. More detailed explanations as to the construction and for the establishment of the wire tensioning follow later.

Figure 2:
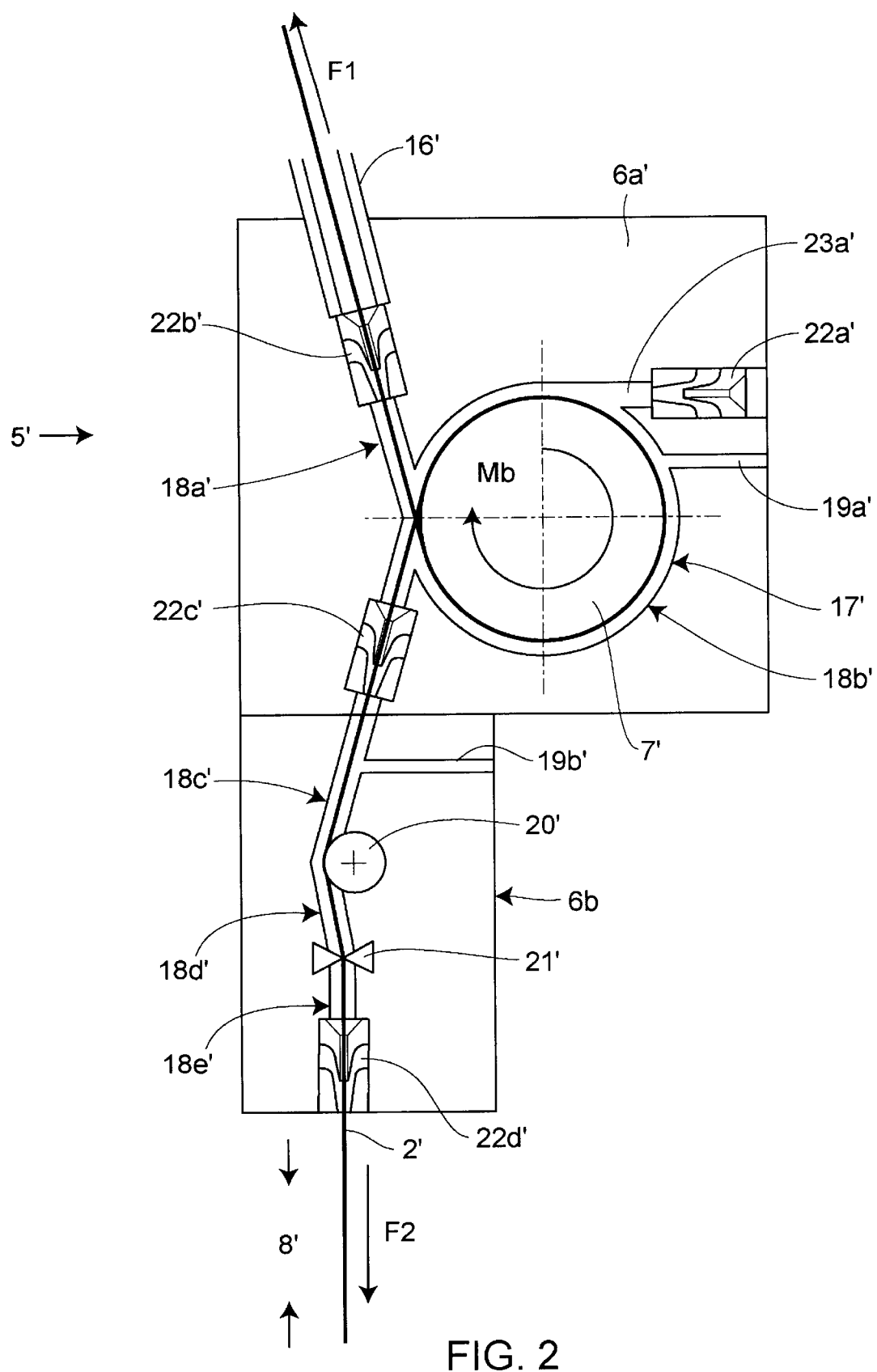
FIG. 2 is a vertical, longitudinal cross-section view through a braking apparatus with another exemplary wire tensioning apparatus constructed in accordance with the teachings of the invention.
Figure 3:
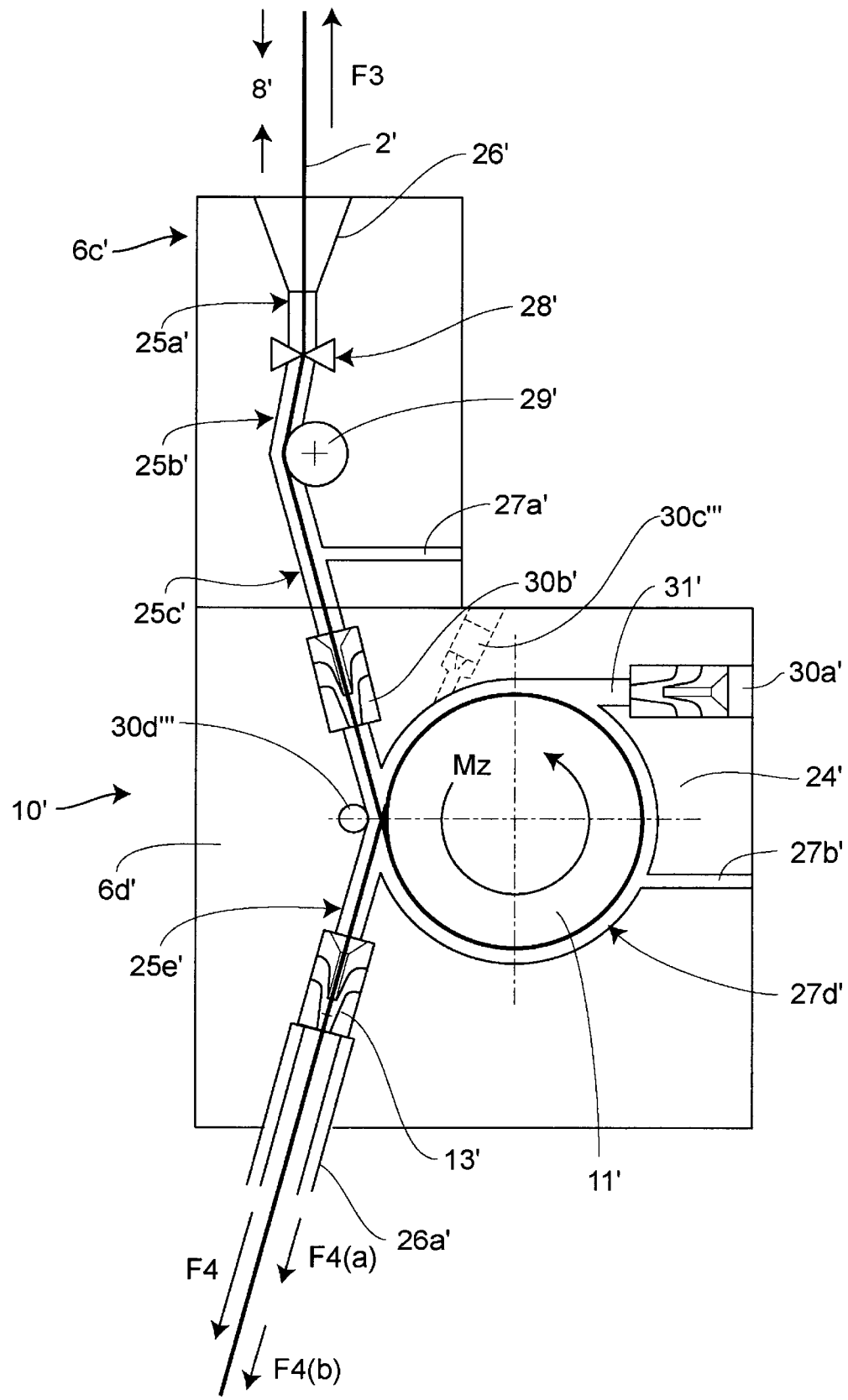
FIG. 3 is a vertical, longitudinal section view through a tensioning element of the wire tensioning apparatus of FIG. 2.

The exemplary wire tensioning apparatus shown in FIGS. 2 and 3, is constructed in accordance with the teachings of the present invention, and exhibits a brake apparatus 5' (FIG. 2), and a tensioning apparatus 10' (FIG. 3). The wire tensioning apparatus is built into a spark erosion machine, which is constructed in similar manner to the spark erosion machine depicted in FIG. 1.

According to FIG. 2, the braking apparatus 5' is placed in a housing-like guide block 6a'. An electrode wire 2' is introduced through a guide tube 16' into a channel system 17'. This channel system 17' is formed in the guide block 6a' and continues in guide block 6b' which is coupled with guide block 6a'. The channel system 17' in FIG. 2 comprises essentially the five following channel sections arranged behind one another in the electrode wire travel direction, namely, 18a', 18b', 18c', 18d', 18e'. That is, in more detail, the channel includes a first, straight line running channel section 18a', a second curved section 18b' circumferentially encompassing a braking roller 7', and then a third, a fourth and a fifth channel section 18c', 18d', 18e', which are respectively straight line sections, although placed in a zig-zag formation. The second and the third channel sections 18b',18c' are respectively connected to relief borings 19a', 19b'.

The braking roller 7' is supported on ball bearings in the guide block 6a'. This roller 7' possesses on its circumference a V-shaped groove, in which the electrode wire 2' can lie.

The electrode wire 2 wraps about the braking roller 7' with a wrap angle of about 330°, so that the electrode wire 2' finds, because of the friction forces, an effective gripping contact with braking roller 7'. Between the third and the fourth channel sections 18c', 18d', an upper electric current supply 20' is placed, and between the fourth and fifth channel sections 18d', 18e', an upper wire guide 21' is located. By means of the described arrangement, it is assured that the electrode wire 2' always leaves the braking roller 7' at the same place, whereby the wrapping angle of 330° is maintained.

Further, a nozzle 22a' is provided, which communicates through a boring 23a' with the second channel section 18b', which circumferentially surrounds the braking roller 7'. Besides this, additional nozzles 22b', 22c', 22d' are to be found in the areas of the first, third, and fifth channel sections 18a', 18c', 18e'. The following nozzles 22a', 22b', 22c', 22d', which are progressively arranged in a sequential manner, serve a main function of easing the changes of direction of the electrode wire as it is initially threaded through the system, and are preferably constructed like the tensioning, injection nozzle 13, 13' depicted in FIG. 4.

Referring to FIG. 3, the tensioning apparatus 10' is placed in a housing-like guide block 6d'. Through this guide block 6d' and through a guide head 6c' coupled with the guide block 6d' is formed a continuous guide channel 24' for the electrode wire 2'. This channel comprises essentially the five sequential channel sections 25a', 25b', 25c', 25d', 25e' located, one after the other in the direction of travel of the electrode wire 2'.

The channel 24 is made up, in other words, of a first channel section 25a', which possesses an inlet funnel 26'. This section 25a' opens in an essentially straight line direction into a second and third channel section 25b', 25c' which, respectively are straight line sections.

The channel continues with a fourth section 25d', encircling a tensioning roller 11' and connecting into a fifth section 25e' which opens into a guide tube 26a'.

In this construction the first, the second, and the third channel sections, (i.e., 25a', 25b' and 25c'), are so arranged, that the electrode wire 2' lies securely against an electric current supply source 29'.

The tensioning roller 11' is supported in the guide block 6d' on rotatable bearings. The roller 11' possesses on its circumference a V-shaped groove in which the electrode wire 2' lies. The wire 2' wraps around the tensioning roller 11' with a wrapping angle of about 330°, so that the electrode wire 2', because of frictional force, has an effective grip thereon. Furthermore, between the first and the second channel sections 25a', 25b', a lower wire guide 28' is located, and between the second and the third channel sections 25b', 25c' a lower current supply source 29' is placed. By means of the described arrangement, assurance is given that the electrode wire 2' always contacts the tensioning roller 11' at a predetermined location, whereby the wrap-around angle of about 330° is maintained. The wire guides 21' and 28' arrange for an exact guidance of the electrode wire in relation to the workpiece.

In the case of the tensioning apparatus 10', a plurality of nozzles are installed at various sections of the transport system, arranged as a sequential nozzle-set. A first nozzle 30a' is to be found at a boring 31' communicating with the fourth channel section 25d', which circumferentially encircles the tensioning roller 11'. An additional nozzle 30b' is provided in the area of the third channel section 25c'. Further, in the fifth channel section 25e', a tensioning nozzle 13' is placed, which, in connection with FIG. 4, will be discussed in more detail below. The remaining nozzles, 30a', 30b' correspond to the tensioning nozzle 13' in construction and service.

Figure 4:
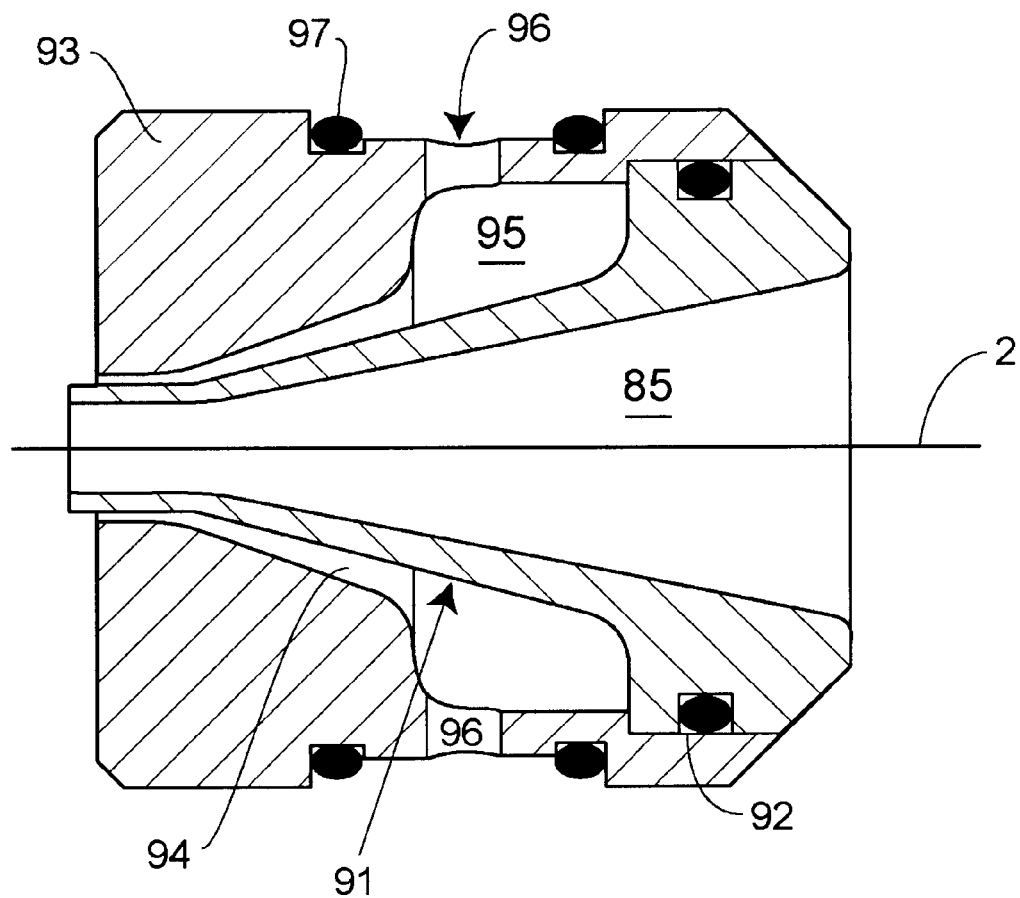
FIG. 4 is an enlarged sectional view of the nozzles shown in FIGS. 1 and 2.

Now turning to FIG. 4, the tensioning nozzles 13, 13' shown respectively in FIGS. 1 and 3, are preferably constructed as double chamber, injection nozzles, having the two chambers 85, 95 essentially coaxial to one another. In this way, a forward discharge funnel forms the inner chamber 85, the outer wall 91 of which is likewise funnel shaped and tapers itself toward the front.

The so created funnel is encapsulated in a hollow cylinder 93, forming, likewise, a funnel-shaped, through-flow passage 94 and sealed against the hollow cylinder 93 by packing 92. The outer wall of the discharge funnel 85, and the inner wall of the funnel-shaped, through passage 94, mutually border at the outer jet chamber 95. Chamber 95 is further connected with a fluid inlet boring 96 to a pressurized fluid inlet channel of the respective guide block 6d, 6d', and by this means, a supply of pressurized fluid is made available to the nozzle.

The corresponding electrode wire 2, 2' runs essentially along the central axis of the nozzle 13, 13' (i.e., through the center of the inner chamber 85). The wall of the inner chamber extends itself slightly beyond the outer nozzle chamber 95 in the direction of travel of the electrode wire. Sealing rings 97 take care for a leak free insertion of the tension nozzle 13, 13' in the corresponding recess of the guide block 6d, 6d'.

The tension apparatuses shown in FIGS. 1 and 2 operate as follows:

In an automatic insert mode of the spark erosion machine 1, the introduced electrode wire 2, 2' is transported through the illustrated wire tensioning apparatus, powered by the flow impulse of the corresponding nozzles through which jets of fluid flow, namely, nozzles, 22a', 22b', 22c', 22d', 30a', 30b' 13', 13 within the channel system 17', which includes the guide channel 24'. In this operation, the electrode wire 2, 2', is entrained, i.e. carried along by the fluid, which flows through the channel system 17' and accordingly the guide channel 24'.

The electrode wire 2, 2' then, is by this method transported through the channel system 17', that is the guide channeling 24'. For a fluid, water of low conductivity serves as the operational liquid, which is regularly employed in spark erosive cutting as a dielectric medium. The relief borings 19a', 19b', 27a', 27b', are located in such positions as where the fluid already has received a substantial part of the next available kinetic boost,—that is to say, somewhere near the third channel section 25c', just before the nozzle 30b', or in the vicinity of the circular channel sections 25d', 18b', as seen in the fluid flow direction, directly in front of the nozzles 30a', 22a'.

This positioning of the relief borings prevents the energy-poor fluid from interfering with the energy-rich fluid too strongly.

In the operation mode of the spark erosion machine, the electrode wire tension is built up and adjusted. At all times,—particularly in the work position 8, 8' at the workpiece 9—this tension should exhibit the specified value with the greatest possible exactness. In the present case, the setting of the desired wire tension is performed by means of the tension nozzles 13, 13', the idler roller 4, as well as the three motors, namely the motor for the clamping roller pair 12, the motor for driving the spool, then the braking roller motor for driving the braking roller 7, 7', and the tensioning roller motor which drives the tensioning roller 11, 11'.

At the same time, the tensioning nozzles 13, 13' arrange for a certain basic tension of the electrode wire 2, 2' in the stretch between the nozzles and the tensioning roller 11, 11', while the nozzles accept fluid through the pressure fluid inlet borings 96, and eject this fluid in the direction of the funnel shaped through-flow opening 94. The injected fluid, as has been explained above, can be air or, for instance, the dielectric fluid used for the spark erosion.

Thereby, as seen in the direction of wire travel, behind the tensioning apparatus 10, 10', especially proximal to the fifth channel section 25e', and the guide tube 26a', a fluid flow, directed away from the tensioning roller 11, 11', is activated, whereby a come-along effect is exerted upon the electrode wire 2, 2'. In other words, the electrode wire 2, 2' is also sucked through by the low pressure evoked by the tensioning nozzle 13, 13'. On this account, a tensioning force F4(a), directed away from the tensioning roller 11, 11', is exerted against the electrode wire 2, 2'. The so produced basic tension in the area (as seen in the electrode wire travel direction) behind the tension roller 11, 11', can be increased, alternatively, by the use of a larger cross-section electrode wire, since, an additional, likewise tensioning force F4(b) away from the tension roller 11, 11' produced by the drive of the spool motors associated with the clamping roller pair 12, can be exerted on the electrode wire 2, 2'. Then, a combined basic tensioning force of F4=F4(a)+F4(b) exists.

As mentioned above, the electrode wire 2, 2' circumferentially wraps around the tensioning roller 11, 11' and, because of the existing base tensioning force F4, the electrode wire 2,2' is brought into effective gripping contact with the tensioning roller 11, 11' also because of the cable-friction-force principle. The basic tensioning force F4 engendered by the tension nozzles 13, 13' and alternatively that of the clamping roller pair 12, brought upon the electrode wire, is also increased, in accord with the cable friction formula, wherein validity is found in:

$$F3 = F4 \times e^{\alpha\mu}$$

where:

F3 is the effective tensile force;

$\alpha$ is the angle of wrap; and $\mu$ is the coefficient of friction.

The effective tensioning force F3, in front of the tensioning roller 11, 11', as seen in the travel direction of the electrode wire, that is (especially at the work position 8, 8' with the workpiece 9, is thus, especially because of the relatively great wrap-around angle of 330°), substantially greater than the base tensioning force F4.

In order to fulfill the so-called compensation condition, this being:

$$Mz=(F4-F3)\times R$$

where R is the radius of the tensioning roller 11, and Mz is a rotational moment, directed counterclockwise on the roller, the rotational moment Mz is brought about by the operation of the motor of the tensioning roller 11, 11'.

With the aid of the braking roller 7, 7', an effective tensile force F2 is brought about which is contrary in direction to F3, and thereby the electrode wire 2, 2' is tensioned as desired in the work position 8, 8' of the machine.

Contributing to this purpose, the braking roller 7, 7' is driven by its associated braking roller motor at a corresponding rotational speed, whereby the moment Mb, in clockwise direction, is exerted upon the braking roller 7, 7'. The tension action between the braking roller 7, 7' and the electrode wire 2, 2' rests again on the cable friction.

Seen in the travel direction of the wire, in this case, in the area in front of the braking roller 7, 7', there is exerted on the electrode wire 2, 2' a basic tension force F1. The basic tension force F1 is clearly less than the desired working tension force F2.

The basic tension force F1 is produced in an area, which, as seen in the direction of wire travel, lying in front of the braking roller 7, 7', the idler roller 4, as explained, is secured by the spring 32 to the spark erosion machine. The idler roller 4 serves, besides this function, as a compensation element (wire storage). The basic tension force F1 is reinforced by the nozzle 13a, which, as shown in FIG. 1 (again, as seen in the direction of travel of the electrode wire), is placed in front of the braking roller 7 (for example, at the braking roller 5' in FIG. 2 in the area of the first channel section 18a'). This activates, as has been explained above, a force directed away from the braking roller 7, 7' onto the electrode wire 2, 2'. Because of the above mentioned reinforcement, considerations can be made, to the effect that, the basic tensile force F1 can be produced alone from the nozzle 13a, that is, further tensioning means such as the idler roller 4 may be done away with. In the area between this nozzle 13a and the supply spool 3, the wire hangs practically without tension (wire storage). In this case, a measuring instrument measures the convexity/concavity of the of the wire, with which data the wire supply spool motor can be controlled. This solution is employed when very small effective forces are required.

Changes in the electrode wire tensioning are compensated for as follows:

As has been explained, the idler roller 4 (which, as seen in the direction of the wire travel), lies in front of the braking roller 7, 7', and is resiliently fastened to the spark erosion machine 1 by a spring means 32. As a result of this arrangement, there exists a connection between the spatial position of the idler roller 4 and the basic tension force F1 effective on the electrode wire 2, 2'.

If one then employs, for instance, a sensor, in order to determine on a continuous basis the respective actual position of the idler roller 4, from the transmitted data, one can determine the respective, effective basic tensile force F1 then present.

With consideration of additional values—(for instance the rotational moment Mb produced by the motor of the braking roller, or the radius of the braking roller R, etc.)—then a central controller (not shown) can determine the available effective tension at the work position 8, 8'. Should this value deviate from the optional value, then the controller can correspondingly make correction by regulation of the braking motor and/or the tensile roller motor and/or the tension nozzle 13, 13' and/or the clamping motor. In this way, the basic tension is kept essentially constant.

Figure 6:
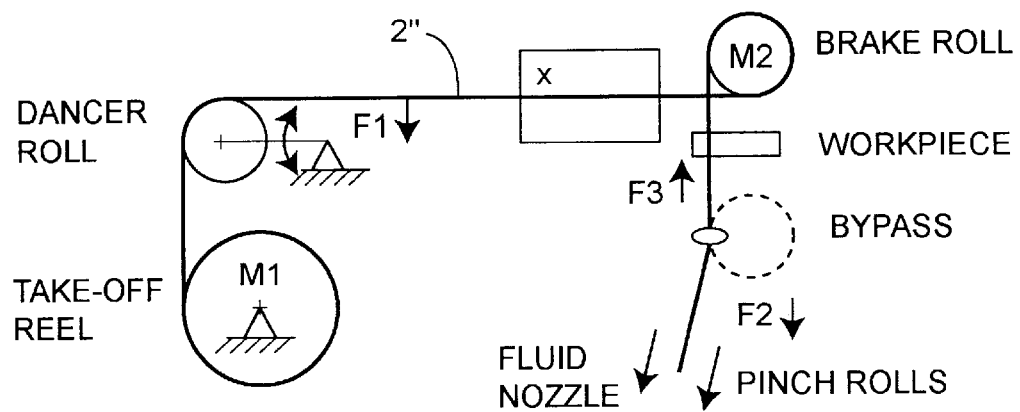
FIG. 6 is a schematic representation of another exemplary wire tensioning apparatus wherein the tensioning roller is bypassed.

In an additional example, depicted in FIG. 6, the area of the tension apparatus 10 is so designed, that its housing can be circumvented without any wrapping of the tensioning roller in a kind of by-pass operation. Thus the effective tension, respectively according to need, (kind of wire, effective force), can be adjusted in various ways. This solution is especially of use, when very small effective forces are required. In this case, the fluid nozzle and/or the clamping roller pair are directly responsible for the effective force. Under certain circumstances, a series or a set of nozzles is necessary, in order to achieve the optimal electrode wire tension. The fluid nozzle is constructed similarly to the nozzle as shown in FIG. 4. The nozzle takes in fluid through its pressure fluid intake port and ejects this in the direction of a funnel shaped opening. By this means, referring to FIG. 6, again a fluid flow directed away from the braking roller is effected, which carries with it the electrode wire 2''', so that this wire is tensioned in the work position at the workpiece. This arrangement is particularly employed when very small effective forces are required. The tensioning apparatus possesses, as is shown in FIG. 3 in dotted lines, an additional nozzle 30c''' and an additional directional change roller 30d'''. The nozzle 30c''' produces, during a time of electrode wire 2''' insertion, a fluid flow which passes by the roller 11' on the left. The electrode wire 2''' moves also from the third channel section 25c' over the change of direction roller 30d''' direct to the fifth channel section 25e'.

Figure 5:
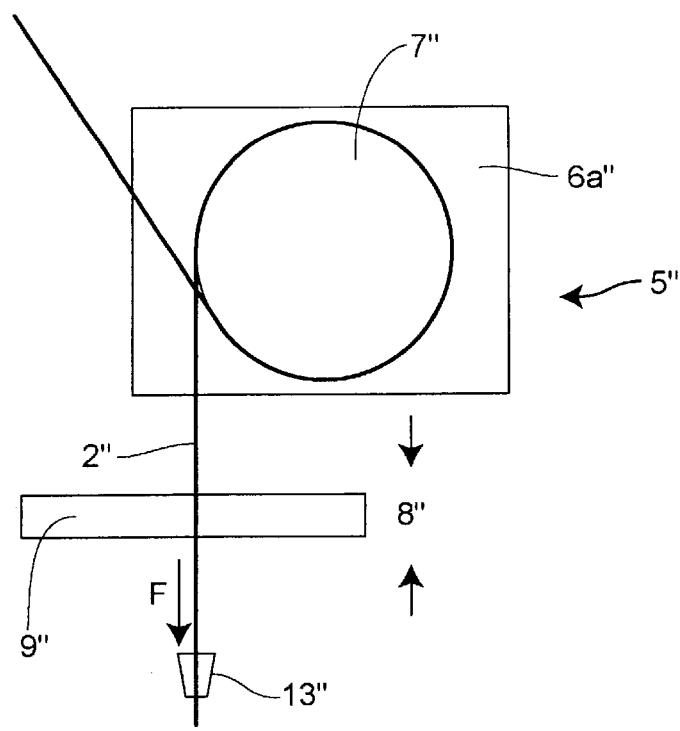
FIG. 5 is a schematic representation of another exemplary wire tensioning apparatus constructed in accordance with the teachings of the present invention.

FIG. 5 shows a schematic representation of another exemplary wire tensioning apparatus constructed in accordance with the teachings of the present invention, which is preferable and appropriate for fine electrode wires. This apparatus possesses principally a braking mechanism 5'', however, no tensioning apparatus.

In this case, the braking apparatus 5'' is constructed like the braking apparatus shown in FIG. 5, and is integrated into a spark erosion machine, which machine, essentially resembles the machine 1 shown in FIG. 1. However, instead of a tensioning apparatus, principally a tensioning nozzle 13'' is provided, and, indeed lies in a zone which (seen in wire travel direction), is behind a work position 8'' with a workpiece 9''. Under certain circumstances, a series, or a set of nozzles are required to achieve the required wire tension. The tension nozzle 13'' is constructed in the same manner as that nozzle shown in FIG. 4, and produces a force F on the wire electrode 2'', which force is directed away from a braking roller 7''. The roller 7'' is supported on bearings in a housing-like guide block 6a''. This is achieved, since the nozzle 13'' takes in fluid through its pressure fluid boring, and ejects this in the direction of a funnel-shaped, through opening. By this means a fluid stream moving in a direction away from the braking roller 7'' is effected, which takes with it the electrode wire 2''. In this way, in the work position 8'' at the workpiece 9'' the electrode wire is under tension. This arrangement is also put to use where very small effective forces are required.

Figure 7A:
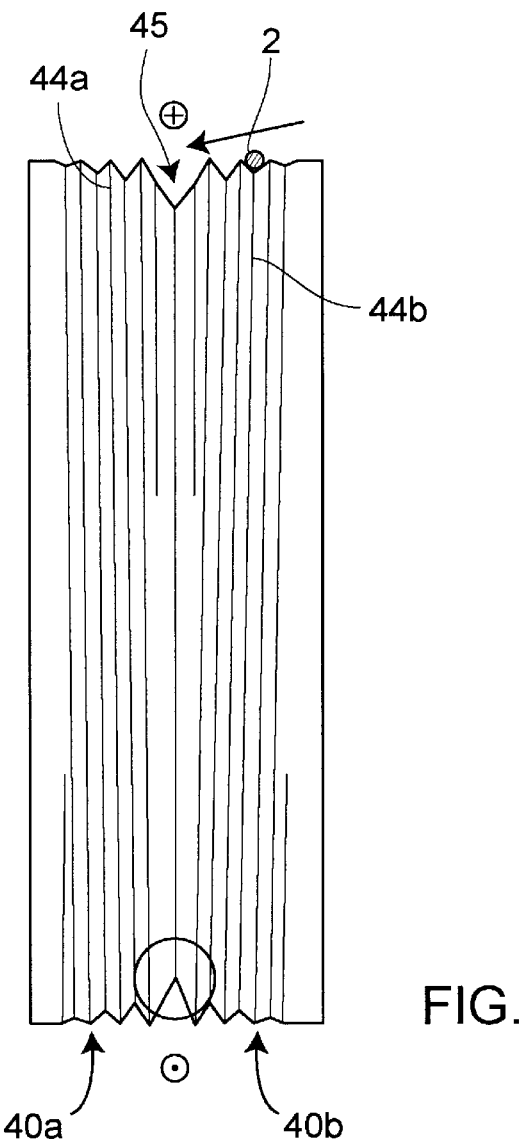
FIG. 7 is a schematic view of the tensioning and braking rollers used by the spark erosion machines.
Figure 7B:
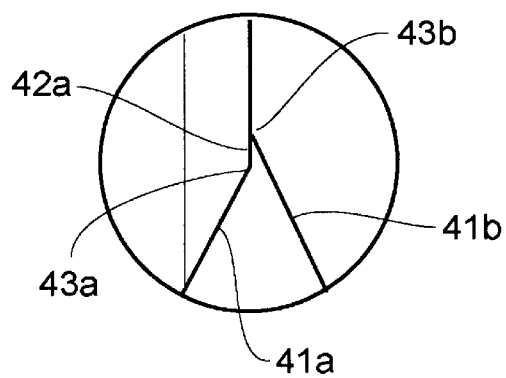

FIG. 7 shows a schematic view of a tensioning roller or a braking roller as the roller would be used in a spark erosion machine as described in the foregoing. This roller is constructed in two parts, which comprise two, coaxial disks, bound together. The disks are essentially cylindrical disks 40*a*, 40*b*. The left disk 40*a* has a conical chamfer on its right circumferential rim. The right disk, in reverse, has a conical chafer on its left circumferential rim. In this way, the combined disks 40*a*, 40*b* form a circumferential V-shaped guide groove between them. In this grooving, the inner edge 43*b* of the chamfer 41*b* of the right disk 40*b* lies nearer to the central axis of rotation of the disks than does the inner edge 43*a* of the chamfer 41*a* of the left disk 40*a*.

As a result, electrode wires of relatively large diameter may run between the surfaces of 41*a* and 41*b*. On the other hand, fine electrode wires, of relatively small diameter, run within the offset between the chamfer 41*b* of the right disk 40*b* and the right sidewall 42*a* of the left disk 40*a*. Additionally, both disks 40*a* and 40*b* are provided with a circumferential, threaded winding 44*a* and a winding 44*b*.

The two threaded windings are counter oriented. Should, for any reason, the electrode wire 2 jump out of the above mentioned V-shaped groove 45 between the chamfers 41*a* and 41*b*, that is, between the chamfer 41*b* and the sidewall 42*a* (if fine wire), the electrode wire will then be transported back from the respective winding 44*a*, 44*b* into the center V-notch.

Although certain examples of apparatus constructed in accordance with the teachings of the invention have been disclosed herein, the scope of this patent is not limited to those examples. On the contrary, this patent covers all apparatus and/or methods falling within the properly constructed scope of the appended claims.

What is claimed is:

1. For use with a spark erosion machine, a wire tensioning system for a wire electrode comprising:
    a braking roller;
    a tensioning roller;
    a wire electrode partially circumferentially embracing at least one of the braking roller and the tensioning roller;
    at least one nozzle for flowing fluid, the at least one nozzle being assigned to at least one of the braking roller and the tensioning roller, wherein the fluid flow through the at least one nozzle exerts a tensioning force upon the wire electrode.

2. A wire tensioning system as defined in claim 1, wherein at least one of the at least one nozzle is a Venturi nozzle.

3. A wire tensioning system as defined in claim 1, wherein at least one of the at least one nozzle is an injector nozzle, and the wire electrode passes through a nozzle chamber of the injector nozzle.

4. A wire tensioning system as defined in claim 1, wherein at least one of the at least one nozzle is assigned to the tensioning roller, wherein the at least one of the at least one nozzle is disposed after the tensioning roller as seen in a direction of travel of the wire electrode, and wherein the tensioning force exerted by the at least one of the at least one nozzle is directed away from the tensioning roller.

5. A wire tensioning system as defined in claim 1, wherein at least one of the at least one nozzle is assigned to the braking roller, wherein the at least one of the at least one nozzle is disposed in front of the braking roller as seen in a direction of travel of the wire electrode, and wherein the tensioning force exerted by the at least one of the at least one nozzle is directed away from the braking roller.

6. A wire tensioning system as defined in claim 1, further comprising means for placing a rotational moment on the tensioning roller.

7. A wire tensioning system as defined in claim 6, wherein the means for placing a rotational moment comprises a motor.

8. A wire tensioning system as defined in claim 1, further comprising means for placing a rotational moment on the braking roller.

9. A wire tensioning system as defined in claim 8, wherein the means for placing a rotational moment comprises a motor capable of braking the braking roller.

10. A wire tensioning system as defined in claim 1, wherein the wire electrode is wrapped nearly once around the braking roller such that, the wire electrode forms an effective grip on the braking roller due to friction.

11. A wire tensioning system as defined in claim 1, wherein the wire electrode is wrapped nearly once around the tensioning roller such that, the wire electrode forms an effective grip on the tensioning roller due to friction.

12. A wire tensioning system as defined in claim 1, further comprising means for measuring the tension of the wire electrode.

13. A wire tensioning system as defined in claim 12, further comprising:
    a direction change roller; and
    a spring to secure the direction change roller to the spark erosion machine, wherein the measuring means measures the tension in the working electrode by determining a position of at least one of the direction change roller and the spring.

14. A wire tensioning system as defined in claim 12, further comprising a control device which controls fluid flow produced by the at least one nozzle in response to the tension measured by the measuring means.

15. A wire tensioning system as defined in claim 1, wherein relief bores permit energy-poor fluid to escape the wire tensioning system.

16. A wire tensioning system as defined in claim 1, wherein at least one of the tensioning roller and the braking roller comprises cylindrical disks forming a groove in an outer circumferential surface of the at least one of the tensioning roller and the braking roller, wherein the groove symmetrically tapers toward a disk axis.

17. A wire tensioning system as defined in claim 16, wherein the at least one of the tensioning roller and the braking roller includes return means for guiding the wire electrode into the groove.

18. A wire tensioning system as defined in claim 16, wherein the cylindrical disks comprise two disks forming the groove therebetween.

19. A wire tensioning system as defined in claim 1, wherein the braking roller is located in a wire entry area, the tensioning roller is located in a wire withdrawal area, and the
    at least one nozzle develops the wire tension in at least one of the wire entry area and the wire withdrawal area.

* * * * *